(12) United States Patent
Kim

(10) Patent No.: US 6,347,932 B1
(45) Date of Patent: Feb. 19, 2002

(54) APPARATUS FOR EXTRUDING AND CUTTING RESIN STRANDS

(75) Inventor: Tae Jong Kim, Yangsan (KR)

(73) Assignee: Han Jin Ind. Co., Ltd., Yangsan (KR)

( * ) Notice: Subject to any disclaimer, the term of this patent is extended or adjusted under 35 U.S.C. 154(b) by 0 days.

(21) Appl. No.: 09/557,645

(22) Filed: Apr. 26, 2000

(30) Foreign Application Priority Data

May 1, 1999 (KR) .......................................... 99-15786

(51) Int. Cl.$^7$ .............................................. B29C 47/88
(52) U.S. Cl. ........................ 425/71; 425/315; 425/316; 425/DIG. 230
(58) Field of Search ........................ 425/71, 308, 315, 425/316, DIG. 230

(56) References Cited

U.S. PATENT DOCUMENTS

| | | | | |
|---|---|---|---|---|
| 4,025,252 A | * | 5/1977 | Hunke | 425/71 |
| 4,528,157 A | * | 7/1985 | Lettner et al. | 425/308 |
| 4,530,649 A | * | 7/1985 | Philipp et al. | 425/71 |
| 4,632,752 A | * | 12/1986 | Hunke | 425/71 |
| 5,474,435 A | * | 12/1995 | Hunke | 425/71 |
| 5,888,554 A | * | 3/1999 | Zollitsch et al. | 425/71 |

* cited by examiner

Primary Examiner—Nam Nguyen
Assistant Examiner—Joseph Leyson
(74) Attorney, Agent, or Firm—Jacobson Holman, PLLC

(57) ABSTRACT

A resin extruding and cutting apparatus including a cooling unit adapted to cool extruded strands emerging from a resin extruding nozzle using cold water and having a bottom wall for feeding the strands to a downstream end of the cooling unit therealong, a cutting unit arranged in the vicinity of a downstream end of the cooling unit and adapted to cut the cooled strands into small pieces, a strand guide unit arranged between the cooling unit and the cutting unit and adapted to guide the strands discharged from the cooling unit a nip defined between drawing rollers included in the cut unit, the strand guide unit providing a strand guide surface for guiding the strands discharged from the cooling unit to the nip, a level adjusting assembly mounted to the cutting unit in such a fashion that a level thereof is adjustable with respect to the cutting unit, the level adjusting assembly hingably supporting the strand guide unit in such a fashion that the strand guide unit is hingable with respect to the cutting unit while being adjustable in level with respect to the cutting unit so that the strand guide surface of the strand guide unit extends from the downstream end of the cooling unit to the nip.

14 Claims, 8 Drawing Sheets

APPARATUS FOR EXTRUDING AND CUTTING RESIN STRANDS

BACKGROUND OF THE INVENTION

1. Field of the Invention

The present invention relates to an apparatus for extruding and cutting resin strands, and more particularly to an apparatus for extruding and cutting resin strands which has a configuration capable of achieving an accurate and easy initial setting for a desired angle of a cooling plate with respect to a cutting unit within a reduced period of time while minimizing the amount of cold water used and eliminating use of any cold water distributor, thereby reducing the manufacturing costs.

2. Description of the Prior Art

A variety of resin extruding and cutting devices are known which are configured to extrude a thermoplastic resin material into continued strands, to cool the extruded strands, and then to cut the strands into small pieces in the form of grains while drying them.

Referring to FIG. 6, an example of a conventional resin extruding and cutting device is illustrated which is disclosed in Japanese Laid-open Patent Publication No. Sho. 60-97806. This resin extruding and cutting device has features in that a water drain port is provided at a cooling plate. As shown in FIG. 6, the resin extruding and cutting device includes a resin extruding unit 71 for extruding a resin material into continued strands, and a resin cooling unit 72 for cooling the strands extruded from the resin extruding unit 71. The resin cooling unit 72 includes a cooling plate 721 arranged in the vicinity of an outlet of the resin extruding unit 71 and adapted to spray cold water onto the strands emerging from the resin extruding unit 71 while feeding those strands from an upstream end thereof to a downstream end thereof, thereby cooling the strands, a drain duct 722 connected at an inlet thereof to the cooling plate 721 near the downstream end of the cooling plate 721 and adapted to drain the water, used to cool the strands, into a water receiving reservoir 723, and a suction duct 724 connected to the cooling plate 721 near the downstream end of the cooling plate 721 and mounted with a suction fan 725 to remove moisture from the strands emerging from the cooling plate 721. The suction duct 724 is open to the water receiving reservoir 723 at an outlet thereof. The resin extruding and cutting device also includes a cutting unit 73 mounted at the downstream end of the cooling plate 721 and adapted to cut the strands emerging from the cooling plate 721 into small pieces of a desired length, a collecting hopper 74 arranged beneath an outlet of the cutting unit 73 and adapted to collect the small pieces discharged from the cutting unit 73, and a drying duct 75 connected to the collecting hopper 74 and adapted to dry the small pieces discharged from the collecting hopper 74 while feeding them to a storage tank. Cold air from an air supply source (not shown) is blown into the drying duct 75.

In the conventional resin extruding and cutting device having the above mentioned configuration, resin strands extruded from the resin extruding unit 71 are cooled by cold water sprayed in the cooling plate 721 while passing through the cooling plate 721, and then introduced into the cutting unit 73. The cooled resin strands are cut by the cutting unit 73 into small pieces of a desired length which are, in turn, discharged into the collecting hopper 24. The small pieces are then fed from the collecting hopper 24 to the storage tank via the drying duct 75 while being dried by cold air flowing along the drying duct 75.

In order to allow the strands to be substantially free of moisture before entering the cutting unit 73, the water used to cool the strands is drained from the cooling plate 721 through the drain duct 722. The moisture attached to the strands are also removed from the strands by a sucking force from the sucking fan 725, and then drained through the sucking duct 724.

However, the above mentioned resin extruding and cutting device involves a problem in that the cooling water once used is drained, for disposal thereof, into the water receiving reservoir, so that a large amount of water is wasted.

The strand emerging from the cooling plate 721 of the cooling unit 72 should enter between drawing rollers included in the cutting unit 73 under the condition in which the entering angle of the strand is adjusted in accordance with the characteristics and diameter of the strand. However, no means capable of achieving such an adjustment is provided at the conventional device. For this reason, there is a problem in that a large amount of cut products with a poor quality are produced.

Referring to FIG. 7, another conventional resin extruding and cutting device is illustrated. This device has features in that it includes a separate drier. As shown in FIG. 7, the resin extruding and cutting device includes a resin extruding nozzle 81 for extruding a resin material into continued strands, and a resin cooling unit 82 arranged near the resin extruding nozzle 81 to cool the strands extruded from the resin extruding nozzle 81. The resin cooling unit 82 includes a cooling plate 821 adapted to spray cold water onto the strands emerging from the resin extruding nozzle 81 while feeding those strands from an upstream end thereof to a downstream end thereof, thereby cooling the strands, a drain duct 823 connected at an inlet thereof to the cooling plate 821 near the downstream end of the cooling plate 821 and adapted to drain the water, used to cool the strands, into a water receiving reservoir 824, a column 825 hingably coupled to the upstream end of the cooling plate 821 at an upper end thereof to hingably support the cooling plate 821, and an extendable angle adjusting unit 827 hingably coupled to a middle portion of the cooling plate 821 at an upper end thereof and adapted to hingably move the cooling plate 821 about the upper end of the column 825 in accordance with an extension or retraction thereof, thereby adjusting the angle of the cooling plate 821. The resin extruding and cutting device also includes a cutting unit 83 mounted at the downstream end of the cooling plate 821 and adapted to cut the strands emerging from the cooling plate 821 into small pieces of a desired length. The cutting unit 83 includes drawing rollers 831 and cutters 832. The cutting unit 83 also includes a water supply pipe 833 for supply a flow of water to feed cut pieces from the cutter 832. The resin extruding and cutting device further includes a conveyor 84 arranged in the vicinity of the outlet of the cutting unit 83 at one end thereof and adapted to feed the cut pieces emerging from the cutting unit 83, and a drier 85 arranged at the other end of the conveyor 84 and adapted to dry the cut pieces fed by the conveyor 84.

In the conventional resin extruding and cutting device having the above mentioned configuration, the strand emerging from the cooling plate 821 of the cooling unit 82 should enter the cutting unit 83 under the condition in which the entering angle of the strand is adjusted in accordance with the characteristics and diameter of the strand. To this end, the extended length of the extendable angle adjusting member 827 is adjusted, thereby adjusting the angle of the cooling plate 821. Thus, the angle of the cooling plate 821 is set.

Resin strands extruded from the resin extruding unit 81 are sufficiently cooled by cold water sprayed in the cooling plate 821 while passing through the cooling plate 821, and then introduced into the cutting unit 83. In order to allow the strands to be stably introduced into the drawing rollers 831 of the cutting unit 83 while allowing a stable and reliable cutting operation of the cutting unit 83, the water used to cool the strands is drained, in a controlled amount, from the cooling plate 821 through the drain duct 823 before the introduction of the strands into the cutting unit 83.

The cooled resin strands are cut by the cutting unit 83 into small pieces of a desired length which are, in turn, discharged into the conveyor 84. The cut small pieces are fed along the conveyor 84 to a drier 85 using a flow of water supplied from the water supply pipe 833, and then dried in the drier 85. Thus, desired products are produced.

In this resin extruding and cutting device, however, it is difficult to accurately set a desired angle of the cooling plate because the cooling plate is heavy and has an integral construction. Furthermore, a lengthened setting time is taken.

Moreover, the set angle of the cooling plate may be easily varied during the operation of the device even due to small impact applied to the cooling plate. In this case, cut products of a poor quality may be produced.

The provision of the drain duct and water supply pipe results in a complexity in the entire water distribution arrangement. As a result, the manufacturing costs of the device are increased.

Although the drain duct is provided at its upper end with a drain plate for draining, in a controlled amount, the water used to cool the extruded strands, the drain plate rather causes problems. That is, it is difficult to achieve an easy manipulation and replacement of the drain plate because the drain plate is arranged within the interior of the cooling plate.

SUMMARY OF THE INVENTION

Therefore, the present invention has been made in view of the above mentioned problems, and an object of the invention is to provide a resin extruding and cutting apparatus having a configuration capable of reducing an initial setting time taken to set a desired angle of a cooling plate with respect to a cutting unit while achieving an accurate adjustment of the set angle using an inexpensive angle adjusting means.

Another object of the invention is to provide a resin extruding and cutting apparatus having a configuration capable of guiding cold water, used to cool extruded resin strands, to the interior of a cutter so that the guided cold water is used to feed cut pieces from the cutting unit, while being capable of allowing the extruded resin strands to be stably introduced between drawing rollers of the cutting unit.

Another object of the invention is to provide a resin extruding and cutting apparatus having a configuration capable of achieving an easy repair, cleaning and replacement of elements while allowing the amount of cold water drained after being used.

In accordance with the present invention, this object is accomplished by providing a resin extruding and cutting apparatus comprising a resin extruding nozzle adapted to extrude a resin material into strands, a cooling unit arranged in the vicinity of the resin extruding nozzle and supported by a base in an inclined state, the cooling unit serving to cool the extruded strands emerging from the resin extruding nozzle using cold water and having a bottom wall for feeding the strands to a downstream end of the cooling unit therealong, a cutting unit arranged in the vicinity of a downstream end of the cooling unit and adapted to cut the cooled strands, emerging from the cooling unit, into small pieces, the cutting unit including a body, a pair of drawing rollers rotatably mounted the body, a fixed blade fixedly mounted to the body, and a rotating blade rotatably mounted to the body, a conveyor inclinedly arranged at a downstream end of the cutting unit, and a drier arranged at a downstream end of the conveyor to dry the cut small pieces, further comprising: a strand guide unit arranged between the cooling unit and the cutting unit and adapted to guide the strands discharged from the cooling unit between the drawing rollers of the cut unit, the strand guide unit providing a strand guide surface for guiding the strands discharged from the cooling unit to a nip defined between the drawing rollers of the cutting unit; a level adjusting assembly mounted to the cutting unit in such a fashion that a level thereof is adjustable with respect to the cutting unit, the level adjusting assembly hingably supporting the strand guide unit in such a fashion that the strand guide unit is hingable with respect to the cutting unit while being adjustable in level with respect to the cutting unit so that the strand guide surface of the strand guide unit extends from the downstream end of the cooling unit to the nip defined between the drawing rollers; and water guide means for guiding the cold water, used to cool the strands in the cooling unit, to the conveyor so that the guided cold water is used as a flow of water adapted to feed the cut small pieces along the conveyor.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
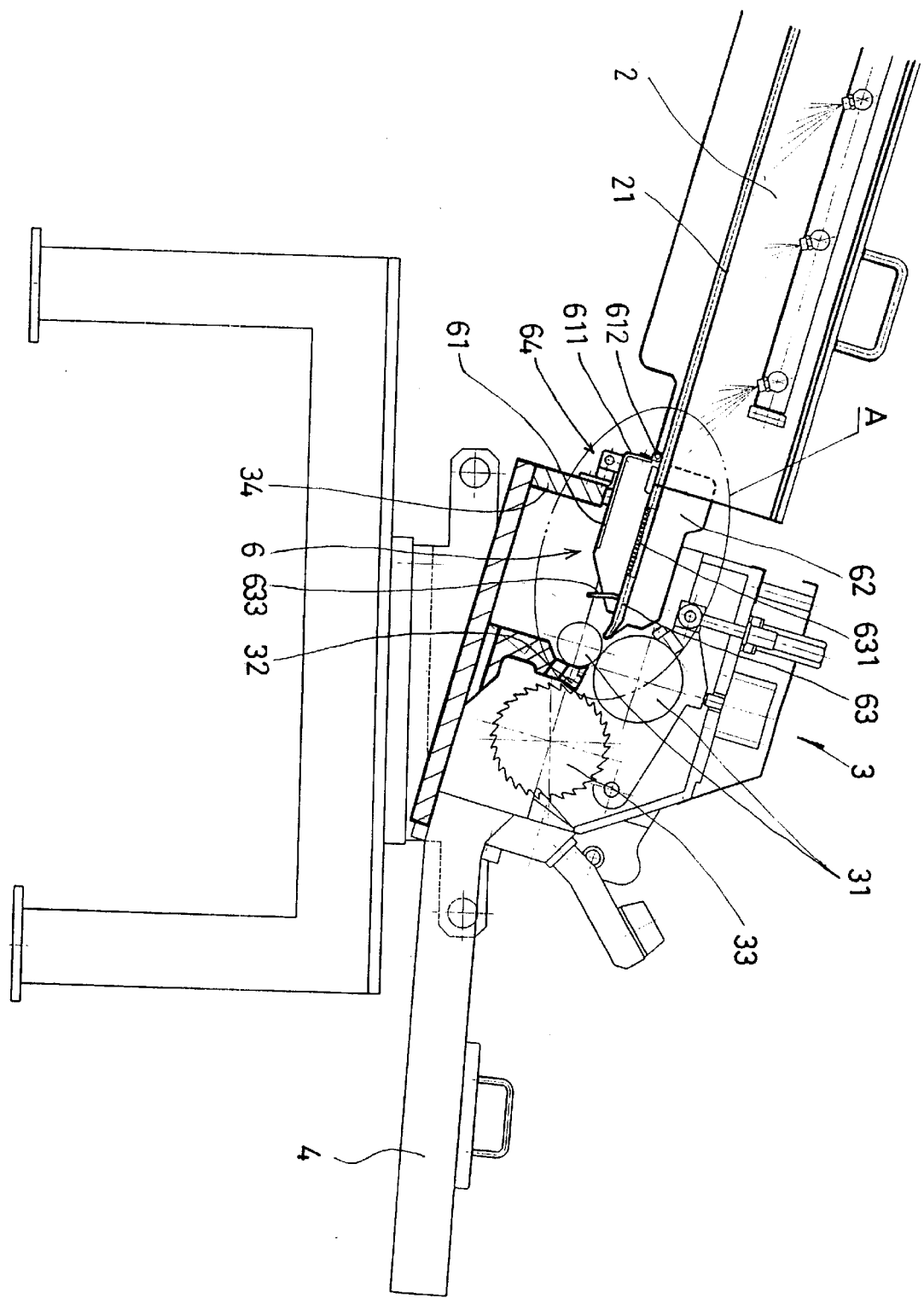
FIG. 1 is a schematic view illustrating a resin extruding and cutting apparatus according to the present invention.

Referring to FIG. 1, a resin extruding and cutting apparatus according to the present invention is illustrated.

Figure 7:
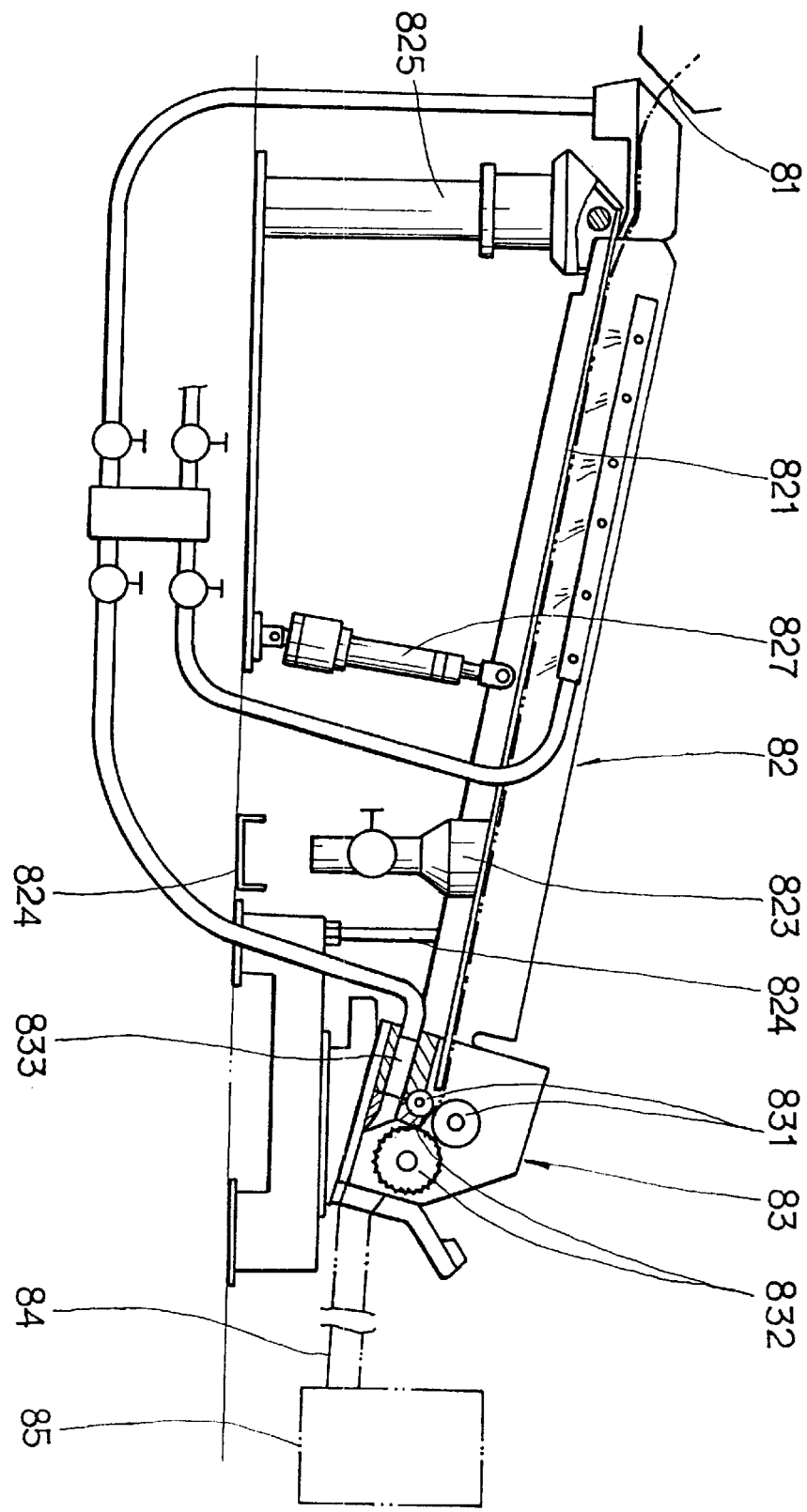
FIG. 7 is a schematic view illustrating another conventional resin extruding and cutting apparatus.

As shown in FIG. 1, the resin extruding and cutting apparatus of the present invention includes a cooling unit 2 arranged in the vicinity of a resin extruding nozzle (not shown) adapted to extrude a resin material into strands. The cooling unit 2 is supported by a base (not shown) in an inclined state and adapted to cool the extruded strands emerging from the resin extruding nozzle using cold water. The cooling unit 2 has a bottom wall 21 along which the strands is fed to a downstream end of the cooling unit 2. The cooling unit 2 also includes a plurality of spray nozzles for spraying cold water onto the strands on the bottom wall 21. The resin extruding and cutting apparatus also includes a cutting unit 3 arranged in the vicinity of a downstream end of the cooling unit 2 and adapted to cut the cooled strands, emerging from the cooling unit 2, into small pieces having a desired length. The cutting unit 3 includes a pair of drawing rollers 31, a fixed blade 32, and a rotating blade 33. A conveyor 4 is inclinedly arranged at a downstream end of the cutting unit 3. A drier (not shown) is also arranged at a downstream end of the conveyor 4 in order to dry the cut small pieces. Such configurations are similar to those of the above mentioned conventional resin extruding and cutting device illustrated in FIG. 7.

In accordance with the present invention, the resin extruding and cutting apparatus further includes a strand guide unit 6 arranged between the cooling unit 2 and the cutting unit 3 in order to guide the strands discharged from the cooling unit 2 to the cutting unit 3. The strand guide unit 6 is hingably mounted to a body of the cutting unit 3 by means of a level adjusting assembly 64 mounted to a vertical wall 34 included in the body of the cutting unit 3. The guide unit 6 includes a bottom plate 61 hingably mounted to the level adjusting assembly 64 at an end thereof arranged adjacent to the cooling unit 2. A vertical plate 611 extends upwardly from the end of the bottom plate 61 arranged adjacent to the cooling unit 2. The guide unit 6 also includes a pair of side plates 62 respectively mounted to both lateral ends of the bottom plate 61 in such a fashion that they extend upwardly to have a height more than that of the vertical plate 611, and a guide plate 63 mounted at both lateral ends thereof to respective side plates 62 while being upwardly spaced from the bottom plate 61. The guide unit 6 is appropriately adjusted in such a fashion that the upper surface of the guide plate 63 is flush with the upper surface of bottom wall 21 of the cooling unit 2. The end of the guide plate 63 toward the cooling unit 2 does not extend to the vertical plate 611 at its end toward the cooling unit 2 in order to define a space therebetween. The space serves to receive the downstream end of the cooling unit 2 in such a fashion that the downstream end of the bottom wall 21 in the cooling unit 2 adjoins with the facing end of the guide plate 63 while being supported by the vertical plate 611.

Figure 2:
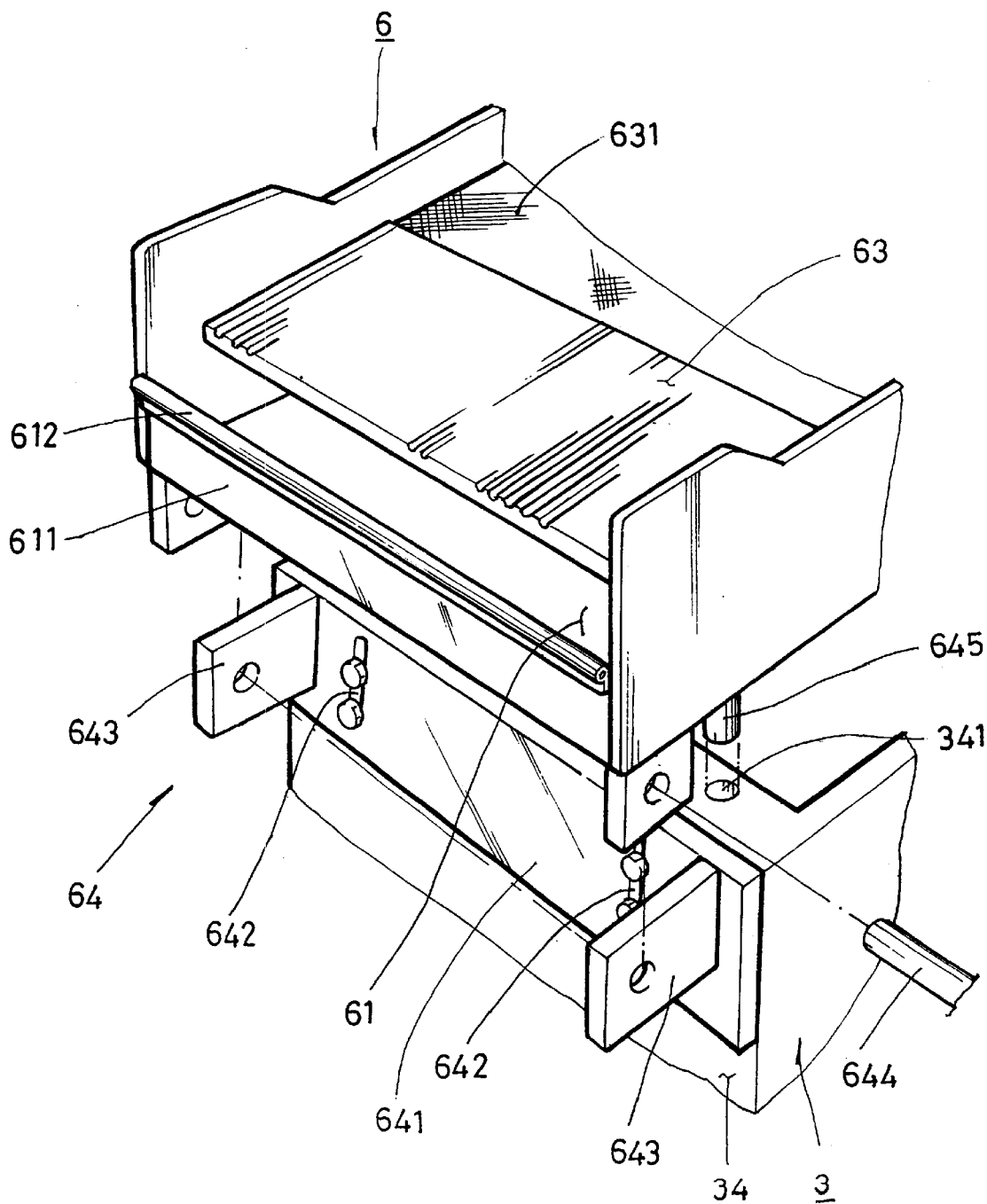
FIG. 2 is a perspective view illustrating a guide unit included in the resin extruding and cutting apparatus in accordance with an embodiment of the present invention.

FIG. 2 is a schematic perspective view illustrating the guide unit 6 and level adjusting assembly 64 respectively having configurations according to an embodiment of the present invention. A pair of horizontally-spaced hinge brackets each having a high hole are mounted to the bottom plate 61 of the guide unit 6. The level adjusting assembly 64 includes a vertical plate 641 provided with a pair of horizontally-spaced vertical slots 642. The vertical plate 641 is also provided with a pair of horizontally-spaced hinge brackets 643 each having a hinge hole. The vertical plate 641 is mounted to the vertical wall 34 of the cutting unit 3 by means of screws respectively inserted into the slots 642 and threadedly coupled to threaded holes of the vertical wall 34. The guide unit 6 is hingably coupled with the level adjusting assembly 64 by aligning the hinge holes of the hinge brackets 643 and then fitting a hinge shaft 644 through the aligned hinge holes. Thus the guide unit 6 is hingably coupled to the cutting unit 3 by means of the level adjusting assembly 64. In order to maintain the guide unit 6 in a stable state without hinging accidentally with respect to the cutting unit 3, a vertical hole 341 is formed in the upper end of the vertical wall 34 included in the cutting unit 3. A vertical pin 645 is also downwardly protruded from the bottom plate 61 of the guide unit 6 so that it is fitted in the vertical hole 341.

A water leakage preventing flange 612 is formed at the upper end of the vertical plate 611 of the guide unit 6. In an assembled state of the apparatus, the water leakage preventing flange 612 comes into contact with the lower surface of the bottom wall 21 in the cooling unit 2 in order to prevent a leakage of the water discharged from the cooling unit 2.

Figure 3:
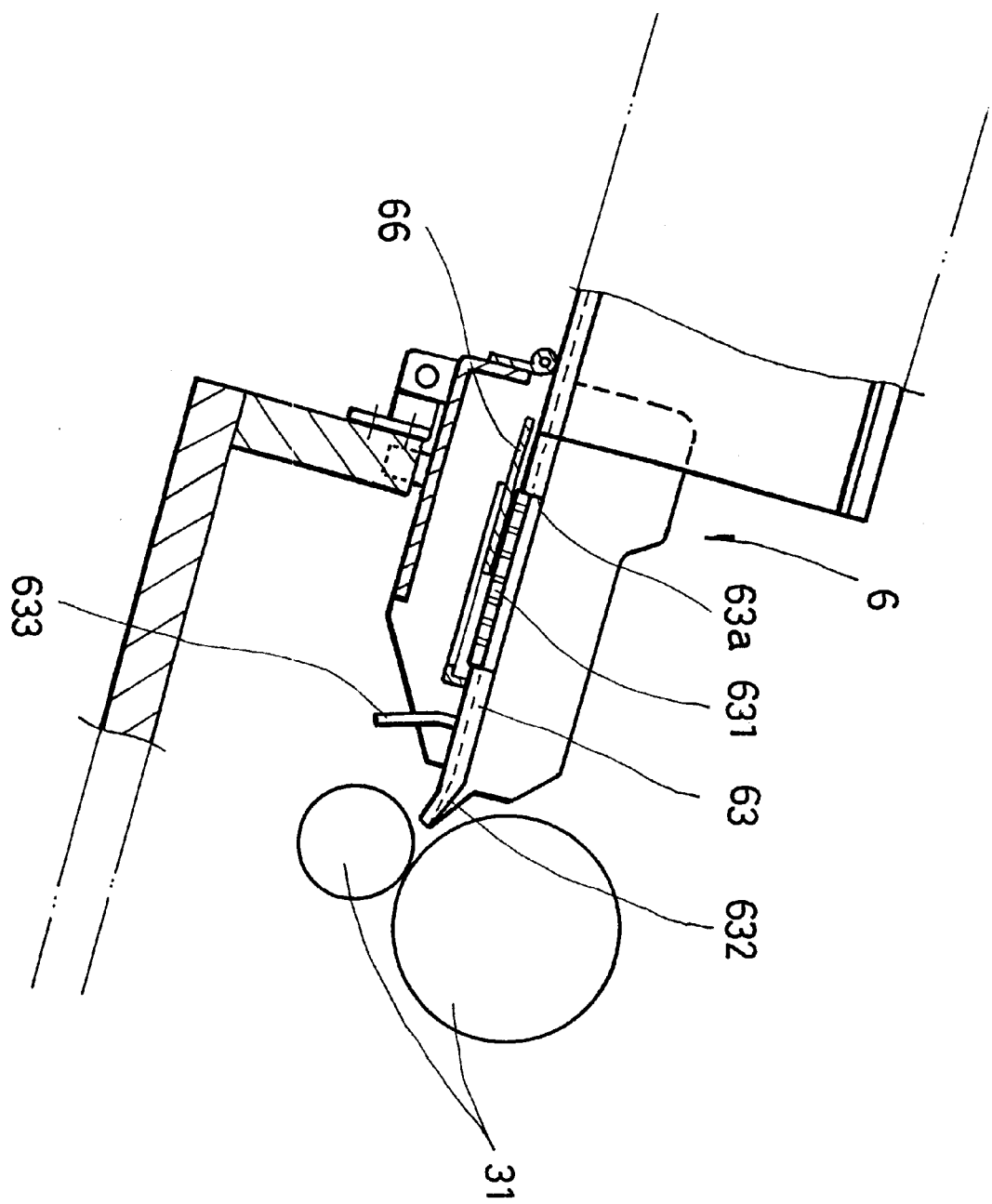
FIG. 3 is an enlarged view corresponding to a portion A of FIG. 1.

FIG. 3 is an enlarged view corresponding to a portion A of FIG. 1. As shown in FIG. 3, an opening 63a is centrally formed at the guide plate 63. A perforated drain plate 631 is mounted to the opening 63a to drain the water from the cooling unit 2 introduced into the guide unit 63. The drain plate 631 is open to the cutting unit 3 in order to supply the drained water to the conveyor 4 via the cutting unit 3. A shield plate 633 is also arranged in order to prevent the water emerging from the drain plate 631 from being scattered. The guide plate 63 is also provided at its downstream end with a bent portion 632 in such a fashion that the downstream end is positioned between the drawing rollers 31.

An opening adjusting plate 66 is slidably arranged beneath the drain plate 631 in order to adjust the opening degree of the drain plate 631, thereby adjusting the amount of water drained through the drain plate 631.

Figure 5:
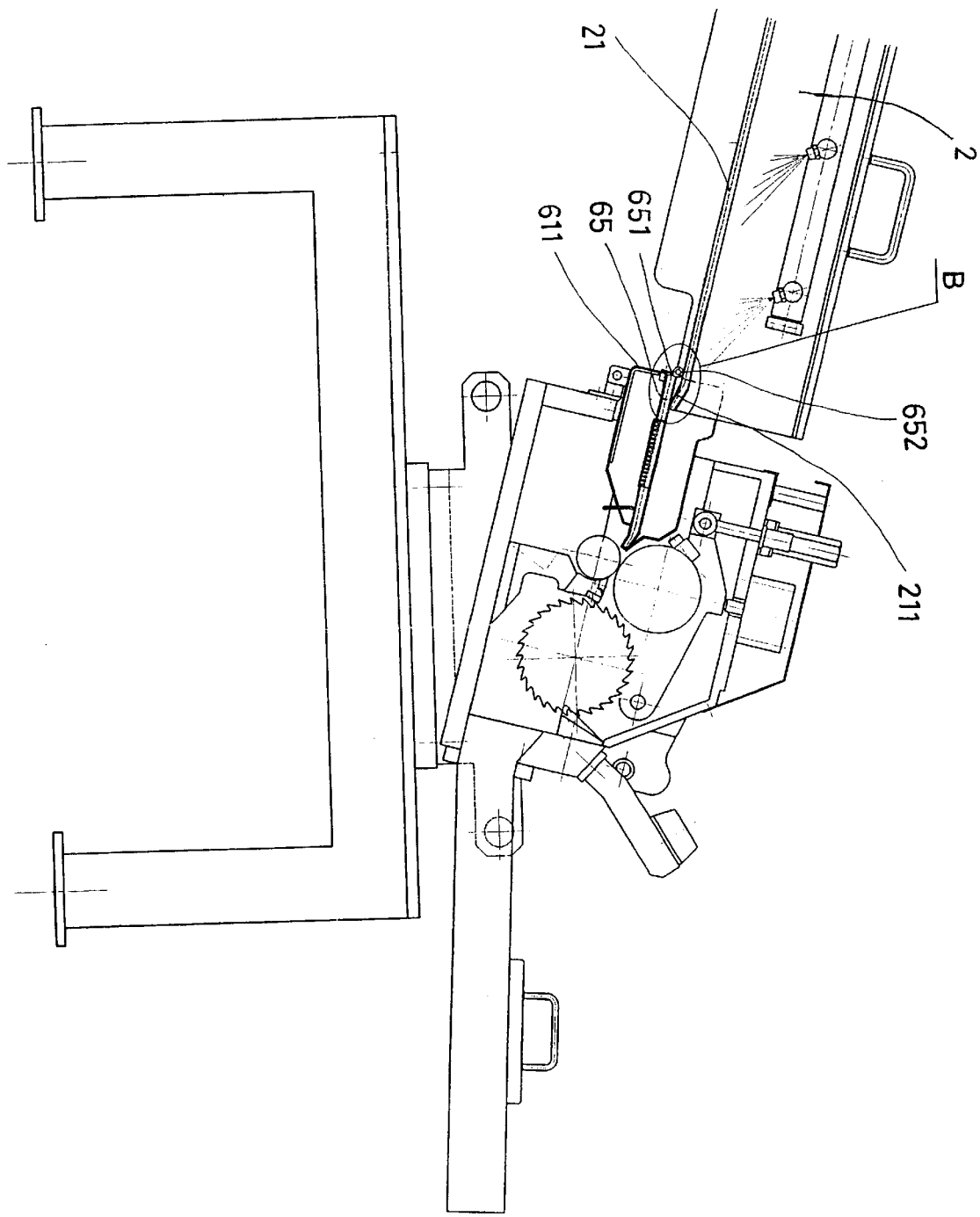
FIGS. 5 and 5A are schematic views illustrating a guide unit according to another embodiment of the present invention.
Figure 5A:
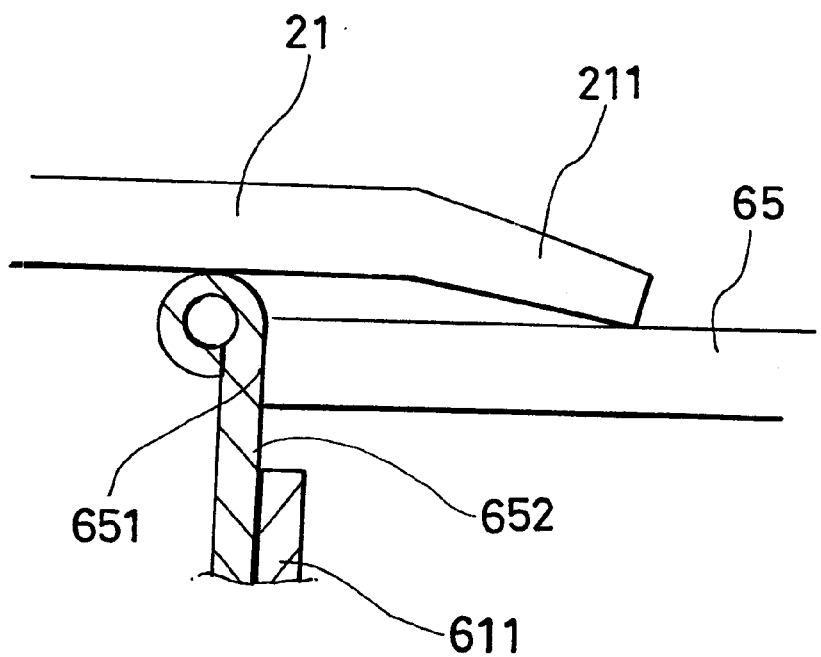
Figure 6:
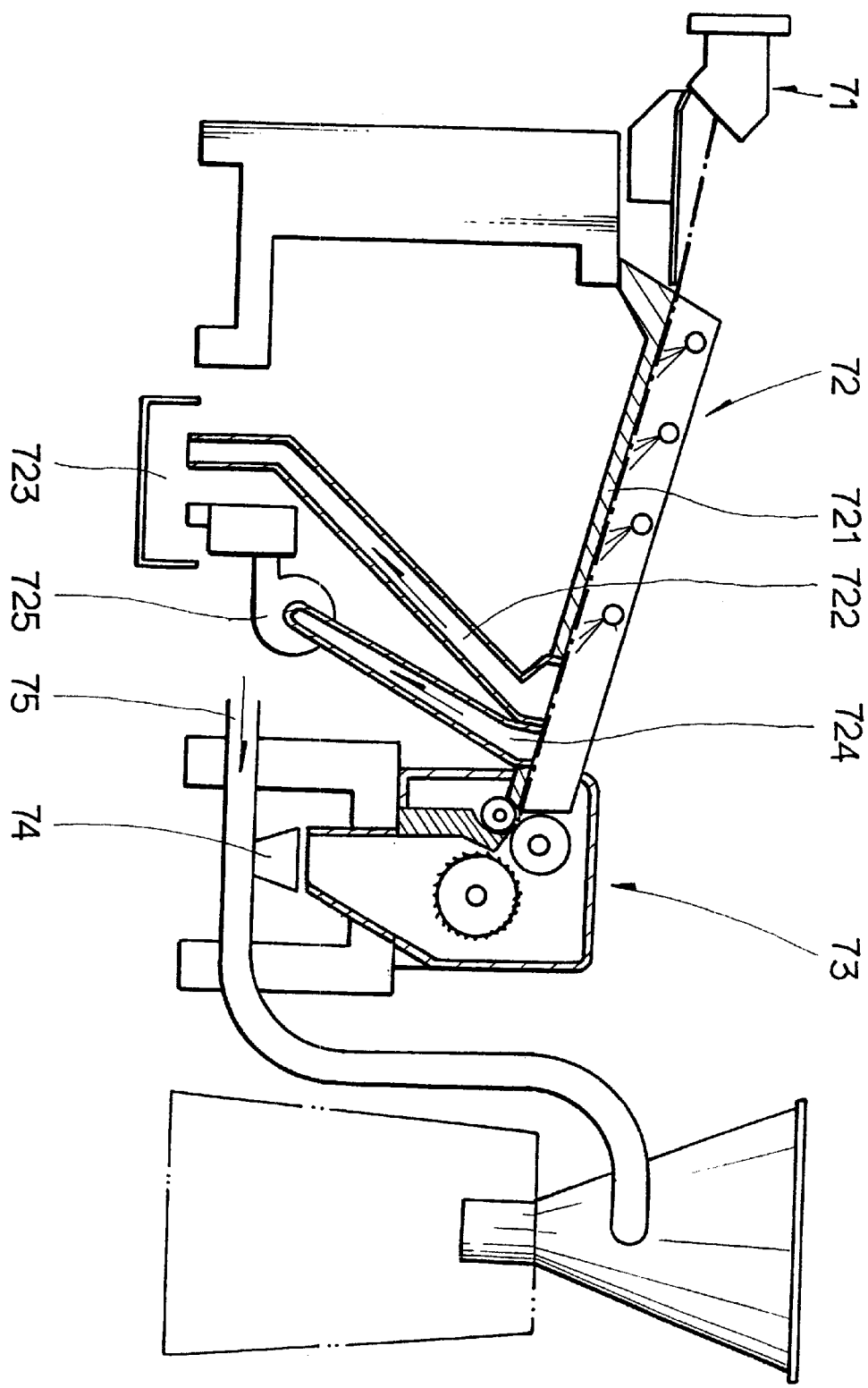
FIG. 6 is a schematic view illustrating a conventional resin extruding and cutting apparatus.

Referring to FIG. 5, another embodiment of the guide unit 6 is illustrated. FIG. 5A is an enlarged detail figure of the part indicated as "B" in FIG. 5. The configuration of FIG. 5 is similar to that of FIG. 2, except that it includes a guide plate 65 extending to the vertical plate 611 at its end 651 toward the cooling unit 2. In this case, the downstream end of the bottom wall 21 in the cooling unit 2 is laid on the guide plate 65. In accordance with this embodiment, a water leakage preventing flange 652 is formed at the end 651 of the guide plate 65. The water leakage preventing flange 652 functions similar to the water leakage preventing flange 612 of FIG. 3. The bottom wall 21 of the cooling unit 2 is also provided at its downstream end with a bent portion 211.

Now, the resin extruding and cutting apparatus having the above mentioned configuration according to the present invention will be described.

In order to extrude a resin material into strands of a desired diameter and to cut the strands into small pieces of a desired length, it is first necessary to set the entering angle of the strands to be introduced into the cutting unit 3, that is, the inclination of the bottom wall 21 in the cooling unit 2. This is carried out by releasing the screws fastened to the slots 642 of the vertical plate 641 included in the level adjusting assembly 64, adjusting the level of the vertical plate 641 in such a fashion that the bending portion 632 of the guide plate 63 is accurately positioned between the drawing rollers 31 of the cutting unit 3, and then fastening again the screws. After the completion of this manipulation, the downstream end of the bottom wall 21 in the cooling unit 2 is simply laid on the vertical plate 611 of the guide unit 6. In this state, the upper surface of the bottom wall 21 is flush with the upper surface of the guide plate 63 of the guide unit 2.

Thereafter, a resin material is extruded into strands by an extruding nozzle (not shown). The cooling unit 2 receives the extruded strands emerging from the extruding nozzle, and feeds them toward the cutting unit 3 while spraying cold water thereon. Thus, the strands are introduced in a cooled state into the cutting unit 3 which, in turn, cuts the introduced strands into small pieces of a desired length. Since the entering angle of the strands to be introduced into the cutting unit 3 is accurately set using the guide unit 6, there is no phenomenon that the strands enter erroneously the cutting unit 3 or vibrate during a cutting operation of the cutting unit 3.

Figure 4:
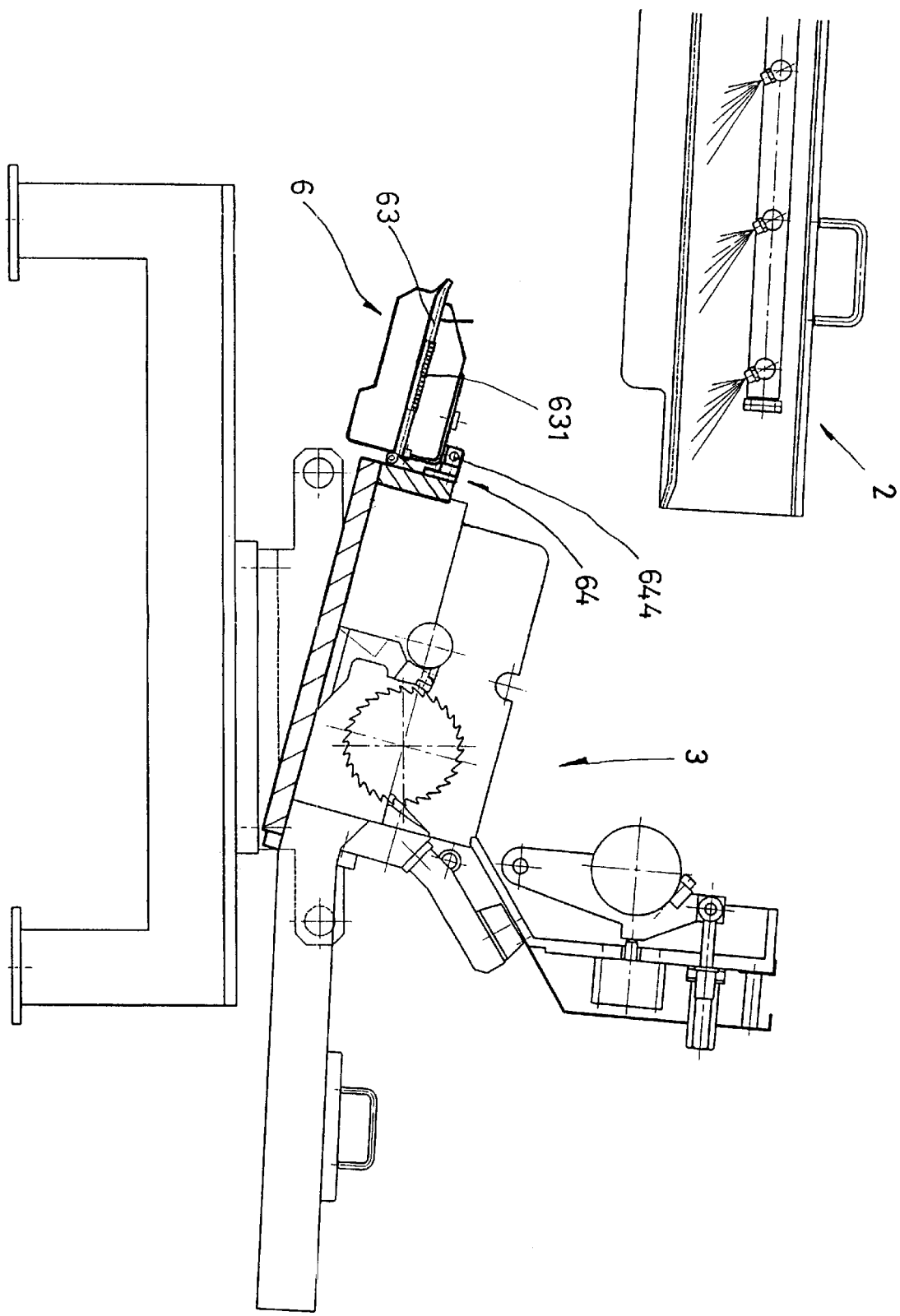
FIG. 4 is a schematic view illustrating an exposed state of the guide unit.

The water used to cool the strands in the cooling unit 2 passes through the drain plate 631 arranged at the opening of the guide plate 63, so that it is supplied to the conveyor 4 via the cutting unit 3. Accordingly, the water serves to feed the cut small pieces along the conveyor 4 to a drier (not shown) without using any separate feeding water supply source.

Where it is necessary to repair the drain plate 631 or to replace it by a new one, a cover mounted to the cutting unit 3 is first opened in order to allow the guide unit 6 to be exposed. Thereafter, the guide unit 6 is rotated 180 degrees about the hinge shaft 644 of the level adjusting assembly 64, as shown in FIG. 4. In this state, a repair of the drain plate 631 or a replacement thereof by a new one can be easily conducted.

As apparent from the above description, in the resin extruding and cutting apparatus of the present invention, it is possible to easily and accurately adjust the entering angle of extruded strands to be introduced into the cutting unit. Accordingly, a reduction in the initial setting time of the apparatus is achieved. This results in an improvement in productivity. The apparatus of the present invention also requires a minimum number of elements used, thereby reducing the manufacturing costs thereof.

In accordance with the present invention, the water used in the cooling unit is drained to the cutting unit and then to the conveyor. Accordingly, it is unnecessary to separately supply cold water for the cutting unit and conveyor. This also eliminates use of a separate cold water distributor.

Since the drain plate can be easily repaired or replaced by a new one, it is possible to avoid the drain plate from being clogged.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A resin extruding and cutting apparatus comprising a resin extruding nozzle adapted to extrude a resin material into strands, a cooling unit arranged in the vicinity of the resin extruding nozzle and supported by a base in an inclined state, the cooling unit serving to cool the extruded strands emerging from the resin extruding nozzle using cold water and having a bottom wall for feeding the strands to a downstream end of the cooling unit therealong, a cutting unit arranged in the vicinity of a downstream end of the cooling unit and adapted to cut the cooled strands, emerging from the cooling unit, into small pieces, the cutting unit including a body, a pair of drawing rollers rotatably mounted to the body, a fixed blade fixedly mounted to the body, and a rotating blade rotatably mounted to the body, a conveyor inclinedly arranged at a downstream end of the cutting unit, and a drier arranged at a downstream end of the conveyor to dry the cut small pieces, further comprising:

a strand guide unit arranged between the cooling unit and the cutting unit and adapted to guide the strands discharged from the cooling unit between the drawing rollers of the cut unit, the strand guide unit providing a strand guide surface for guiding the stands discharged from the cooling unit to a nip defined between the drawing rollers of the cutting unit;

a level adjusting assembly mounted to the cutting unit in such a fashion that a level thereof is adjustable with respect to the cutting unit, the level adjusting assembly hingably supporting the strand guide unit in such a fashion that the strand guide unit is hingable with respect to the cutting unit while being adjustable in level with respect to the cutting unit so that the strand guide surface of the strand guide unit extends from the downstream end of the cooling unit to the nip defined between the drawing rollers; and water guide means for guiding the cold water, used to cool the strands in the cooling unit, to the conveyor so that the guided cold water is used as a flow of water adapted to feed the cut small pieces along the conveyor, wherein the water guide means comprises:

an opening formed at a desired portion of a guide plate in the strand guide unit; and a perforated drain plate mounted to the opening and opened to the cutting unit, the drain plate serving to drain the cold water, flowing from the cooling unit along the guide plate, into the cutting unit.

2. The resin extruding and cutting apparatus according to claim 1, wherein the strand guide unit comprises:

a bottom plate hingably mounted to the level adjusting assembly at an end thereof arranged adjacent to the cooling unit;

a vertical plate extending upwardly from the end of the bottom plate;

a pair of side plates respectively mounted to both lateral ends of the bottom plate in such a fashion that they extend upwardly to have a height more than that of the vertical plate; and the guide plate horizontally-extending and mounted at both lateral ends thereof to the side plates, respectively, at a level slightly higher than an upper end of the vertical plate, the guide plate having an upper surface serving as the strand guide surface.

3. The resin extruding and cutting apparatus according to claim 2, wherein the level adjusting assembly comprises:

a vertical plate provided with a pair of horizontally-spaced vertical slots, the vertical plate of the level adjusting assembly being mounted to the body of the cutting unit at a desired level by screws respectively inserted into the vertical slots and coupled to the body of the cutting unit; and a pair of horizontally-spaced hinge brackets fixedly mounted to the vertical plate of the level adjusting assembly, each of the hinge brackets hingably coupled to the bottom plate of the guide unit.

4. The resin extruding and cutting apparatus according to claim 2, further comprising:

means for preventing the guide unit from hinging with respect to the cutting unit.

5. The resin extruding and cutting apparatus according to claim 4, wherein the means for preventing the guide unit from hinging with respect to the cutting unit comprises:

a vertical hole formed in an upper end of the body of the cutting unit; and a vertical pin downwardly protruded from the bottom plate of the guide unit, the vertical pin being fitted in the vertical hole.

6. The resin extruding and cutting apparatus according to claim 2, wherein the bottom wall of the cooling unit extends into the strand guide unit at an end corresponding to the downstream end of the cooling unit.

7. The resin extruding and cutting apparatus according to claim 6, wherein the guide plate is horizontally spaced apart from the vertical plate at an end thereof toward the cooling unit to define a space for receiving the downstream end of the bottom plate of the cooling unit under a condition in which the bottom plate of the cooling unit is laid on an upper end of the vertical plate in the strand guide unit at the end thereof while being flush, at an upper surface thereof, with the upper surface of the guide plate in the strand guide unit in an adjoined state.

8. The resin extruding and cutting apparatus according to claim 7, wherein the vertical plate of the guide unit has a water leakage preventing flange with which the bottom plate of the cooling unit is in contact at a lower surface thereof.

9. The resin extruding and cutting apparatus according to claim 6, wherein the guide plate extends, at an end thereof toward the cooling unit, in such a fashion that the end is vertically aligned with the vertical plate in such a fashion that the bottom plate of the cooling unit is laid on the upper surface of the guide plate at the end thereof.

10. The resin extruding and cutting apparatus according to claim 9, wherein the guide plate is provided, at the end toward the cooling unit, with a water leakage preventing flange with which the bottom plate of the cooling unit is in contact at a lower surface thereof.

11. The resin extruding and cutting apparatus according to claim 9 wherein the bottom plate of the cooling unit is provided, at the end thereof, with a bent portion being flush, at an upper surface thereof, with the upper surface of the guide plate in the strand guide unit.

12. The resin extruding and cutting apparatus according to claim 2, wherein the guide plate of the strand guide unit is provided, at an end toward the drawing rollers, with a bent portion for assisting the strand guidance of the guide plate to the nip between the drawing rollers.

13. The resin extruding and cutting apparatus according to claim 1, the water guide means further comprises:

a shield plate mounted to a lower surface of the guide plate in the vicinity of the opening and adapted to prevent the water drained through the drain plate from being scattered.

14. The resin extruding and cutting apparatus according to claim 1, wherein the water guide means further comprises:

an opening adjusting plate slidably arranged beneath the drain plate and adapted to adjust an opening degree of the drain plate, thereby adjusting an amount of water drained through the drain plate.

* * * * *